(12) United States Patent
Courtney

(10) Patent No.: US 7,697,477 B2
(45) Date of Patent: Apr. 13, 2010

(54) COMMUNICATIONS PROTOCOL TO FACILITATE HANDOVER IN A WIRELESS COMMUNICATIONS NETWORK

(75) Inventor: William F. Courtney, Long Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 1938 days.

(21) Appl. No.: 10/290,767

(22) Filed: Nov. 7, 2002

(65) Prior Publication Data

US 2004/0090935 A1    May 13, 2004

(51) Int. Cl.
*H01J 3/16* (2006.01)
*H04Q 7/20* (2006.01)

(52) U.S. Cl. .................. 370/331; 370/458; 370/328; 370/509; 370/503; 455/436; 455/437; 455/438; 455/439; 455/442

(58) Field of Classification Search .......... 370/294, 370/350, 516, 358, 95.3, 108, 107, 280, 347, 370/329, 331, 458, 328, 509, 503, 517, 324; 455/436, 437, 438, 439, 440, 441, 423, 425, 455/432.2, 435.1, 435.2, 442

See application file for complete search history.

(56) References Cited

U.S. PATENT DOCUMENTS

| | | | |
|---|---|---|---|
| 3,995,111 A | 11/1976 | Tsuji et al. | |
| 5,519,710 A * | 5/1996 | Otsuka | 370/337 |
| 5,561,838 A | 10/1996 | Chandos et al. | |
| 5,659,545 A | 8/1997 | Sowles et al. | |
| 5,711,003 A * | 1/1998 | Dupuy | 455/436 |
| 5,761,608 A | 6/1998 | Andresen et al. | |
| 5,991,632 A * | 11/1999 | Guillame | 455/466 |
| 6,005,854 A * | 12/1999 | Xu et al. | 370/335 |
| 6,094,575 A | 7/2000 | Anderson et al. | |
| 6,127,967 A | 10/2000 | Ghazvinian et al. | |
| 6,157,845 A | 12/2000 | Henry et al. | |
| 6,181,683 B1 | 1/2001 | Chevillat et al. | |
| 6,314,269 B1 * | 11/2001 | Hart et al. | 455/12.1 |
| 6,366,566 B1 | 4/2002 | Scott | |
| 6,385,451 B1 | 5/2002 | Kalliokulju et al. | |
| 6,388,997 B1 * | 5/2002 | Scott | 370/280 |
| 6,470,057 B1 * | 10/2002 | Hui et al. | 375/294 |
| 6,757,270 B1 * | 6/2004 | Kumar et al. | 370/342 |

(Continued)

FOREIGN PATENT DOCUMENTS

EP    0 893 931 A1    1/1999

(Continued)

OTHER PUBLICATIONS

European Search Rep., Feb. 5, 2004.

*Primary Examiner*—Huy Phan
*Assistant Examiner*—Julio Perez
(74) *Attorney, Agent, or Firm*—Tarolli, Sundheim, Covell & Tummino LLP

(57) ABSTRACT

Handover in a wireless communications system from a first communications platform to a post-handover platform is implemented utilizing low-level synchronization mechanisms to enable at least some of a plurality of terminals to adjust timing and synchronize communications with the post-handover platform. Synchronization with the post-handover platform can be facilitated based on a comparison between an expected time to receive response data and the actual time that such data is received from the post-handover platform.

24 Claims, 8 Drawing Sheets

U.S. PATENT DOCUMENTS

| | | | |
|---|---|---|---|
| 6,980,803 B2* | 12/2005 | Johansson | 455/438 |
| 6,982,971 B2* | 1/2006 | Tiedemann et al. | 370/333 |
| 2002/0045451 A1* | 4/2002 | Hwang et al. | 455/442 |
| 2003/0007471 A1* | 1/2003 | Terasawa et al. | 370/335 |
| 2004/0057400 A1* | 3/2004 | Walsh et al. | 370/329 |
| 2005/0030964 A1* | 2/2005 | Tiedemann et al. | 370/431 |
| 2006/0195551 A1* | 8/2006 | Dowling | 709/217 |

FOREIGN PATENT DOCUMENTS

| | | |
|---|---|---|
| WO | WO 00/07306 | 2/2000 |
| WO | WO 02/05457 | 1/2002 |

\* cited by examiner

COMMUNICATIONS PROTOCOL TO FACILITATE HANDOVER IN A WIRELESS COMMUNICATIONS NETWORK

TECHNICAL FIELD

The present invention relates generally to communications, and more particularly to a communications scheme that facilitates handover in a wireless communications network.

BACKGROUND OF THE INVENTION

Wireless communication systems have become increasingly popular for many applications and types of information, including voice and data communications. Such communication systems are designed to communicate information in a transparent manner, with each end user (e.g., communication equipment, such as terminals or base stations) generally being responsible for ensuring that the data ultimately delivered is in a desired form. An advantage of wireless communication is the mobility of communications equipment.

Many wireless communications systems employ a layered architecture for digital communication systems, such as based on the International Organization for Standardization reference model for Open Systems Interconnection (referred to as the "OSI Reference Model"). The OSI Reference Model provides a standard to facilitate connecting open systems; namely, systems that are open for communication with other systems. The OSI model has seven layers, each of which performs a well-defined function. The layers include a physical layer, a data link layer, a network layer, a transport layer, a session layer, a presentation layer and an application layer.

Due to the mobility of communications equipment and satellite stations, in operation, it is often necessary to pass signaling from one base station or platform to a next base station, which event is referred to as a handover. Typically, handover occurs as part of bi-directional communication between the network and the terminal equipment that is being handed over to a new platform or frequency. Such bi-directional communication is usually implemented via high-level communications in the OSI communications model, such as at the network layer or other higher layer. The network layer handover usually requires several messages to be exchanged in sequence between the network and the terminal being handed over. This message exchange can cause considerable delay in achieving the handover. Additionally, because the data in the message exchange is higher level data (e.g., network layer data), the messages are processed by the network and terminals in order to implement the handover event. Accordingly, undesirable processing delays also can accompany such handover, which can further tie up system resources. The delays become even more significant when there are increased propagation delays due to such signaling between the terminals being handed over and the network.

While a network layer handover is generally manageable for handover events for small numbers of terminal, the messaging and processing delays associated with network level handover tend to become even more pronounced for mass handover events. A mass handover event corresponds to a situation when a relatively large number of terminals are being handed over concurrently. A mass handover event can occur, for example, when a communications platform being used by a plurality of terminals is being replaced by another platform.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates generally to a handover scheme for a wireless communications network. The handover is implemented utilizing low-level synchronization mechanisms, such as part of the data link layer, which enable at least some of the terminals to adjust timing and synchronize communications with the next platform. Because higher level communications, such as can occur at the network layer or higher, are not required to implement the handover, the handover that can be implemented efficiently, especially for mass handover events. Thus, handover from a first or pre-handover communications platform to a next or post-handover platform can occur concurrently for plural communications terminals.

According to one aspect, handover can be implemented in a wireless communications network having a plurality of terminals synchronized for network communications via a pre-handover base platform. The handover occurs, for example, by terminals transmitting a signal having timing information, such as can be transmitted in a predetermined slot or channel of a wireless communications framework. Each terminal can estimate an expected time for receiving a response to the transmitted signal, such as corresponding to the pre-handover platform. The terminals receive a response to the transmitted signal at some time and comparing this to the expected time. The terminals then adjust timing for subsequent signal transmissions based on the comparison. In some cases, a platform (e.g., the pre-handover platform) can broadcast a network message to the terminals that are to be handed over indicative of a handover event. The content of such broadcast message can vary depending on system complexity and design requirements, for example.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to handover in a wireless communications system. The handover is implemented utilizing low-level synchronization mechanisms, such as part of the data link layer, which enable at least some of the terminals to adjust timing and synchronize communications with the next platform. Because higher level communications, such as can occur at the network layer or higher, need not be utilized to implement the handover, the handover that can be implemented efficiently, especially for mass handover events involving plural terminals. Thus, handover from a first (pre-handover) communications platform to a next (post-handover) platform can occur concurrently for plural communications terminals.

Figure 1:
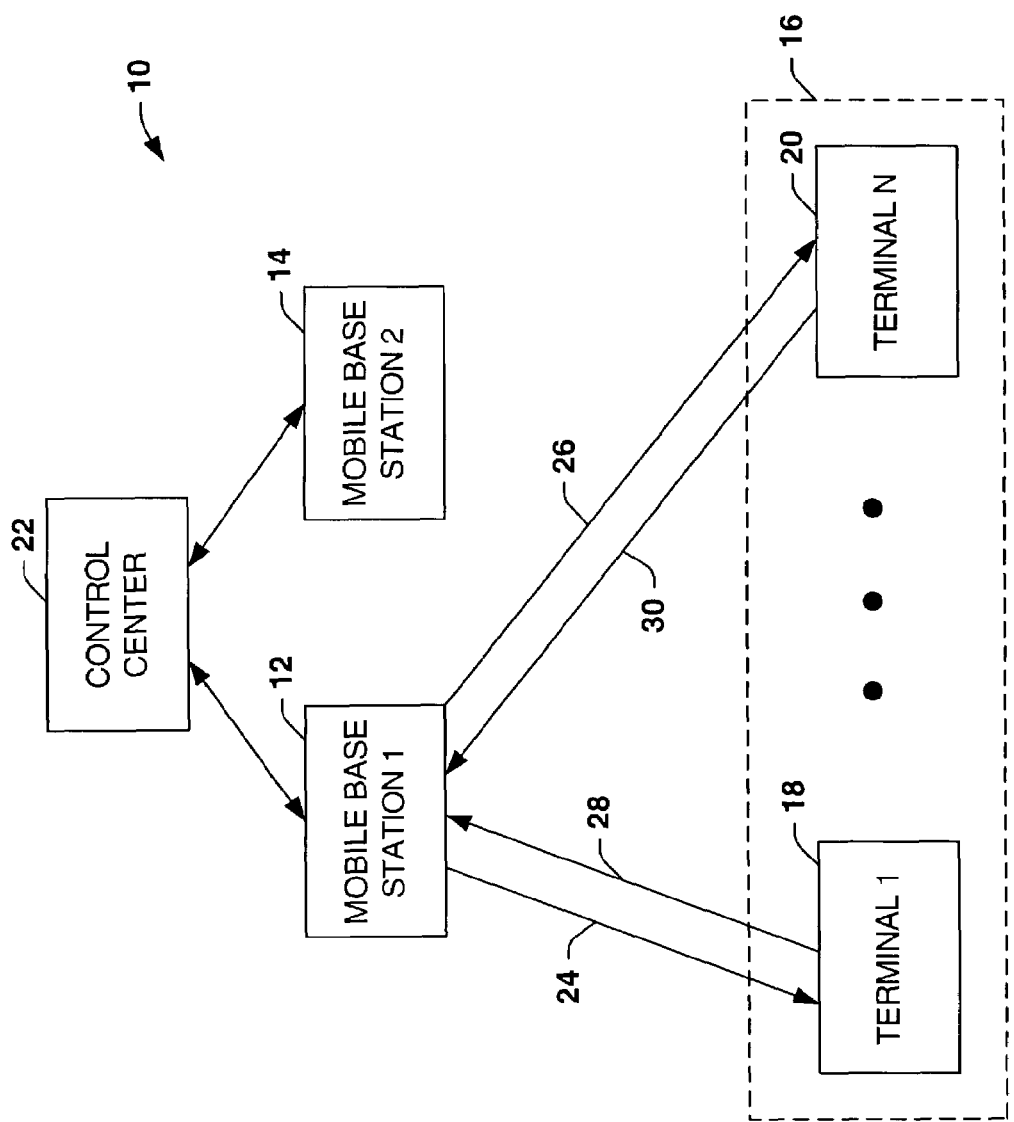
FIG. 1 illustrates a communications system in a pre-handover condition in accordance with an aspect of the present invention.

FIG. 1 illustrates a communications network 10 operative to implement handover in accordance with an aspect of the present invention. The network 10 includes plural base stations 12 and 14. As used herein, the terms "base station" and "platform" are used interchangeably to refer generally to communications equipment operating a network hub for a set of other communications equipment in the network. The base stations 12 and 14 can be mobile base stations, such as non-terrestrial stations (e.g., satellites or aircrafts). Alternatively, the base stations 12 and 14 can be fixed terrestrial base stations, such as satellite network transceivers distributed about the network 10.

The network 10 also includes a set 16 of one or more terminals 18-20 that are operative to communicate throughout the network via one or more of the base stations 12 and 14. The terminals 18-20 can be fixed terrestrial communication stations (e.g., customer premises equipment (CPE)) or, alternatively, they can be mobile stations (e.g., terrestrial or airborne). The terminals 18-20 communicate in the network 10 through one or more of the base stations 12 and 14. For purposes of brevity, only two terminals 18-20 are depicted within the set of terminals 16. It will be understood and appreciated that there can be any number of one or more terminals in the set 16, as indicated by the ellipsis between the terminals 18 and 20.

The network 10 also includes a control center 22 that controls communications parameters for the network. The control center 22 can be terrestrial or non-terrestrial communications equipment. It is also to be appreciated that the control center 22 can be integrated into one of the base stations 12 or 14 as well as in one or more of the terminals 18-20. Alternatively, the control center 22 can be a terrestrial control center and the satellites operate as repeaters enabling communications between the terminals 18-20 and the control center.

By way of example, the control center 22 stores and maintains a data space or data structure corresponding to network operation and status of network equipment. The data structure includes, for example, status information associated with the individual network components 12-20, such as framing and time slot information, identification information and the like. The control center 22 also is operative to implement controls in the network 10 based on the status, location information or other network-related parameters. The network control center 22 further can employ various processes, such as to allocate and manage network resources (e.g., frequency and bandwidth), to manage communications between active network equipment as well as to authenticate new equipment entering the network 10.

It is to be understood and appreciated that control center 22 can signal equipment within the network, including one of the base stations 12 or 14, the terminal equipment 18-20, or both, to initiate mode changes, such as including a handover. Alternatively or additionally, the base station 12 and/or the equipment itself can be programmed to implement similar controls, including to initiate a handover event. The particular functionality implemented at each of the equipment 12-22 generally can be set as a matter of design choice, such as based on system requirements, processing capabilities of such equipment and ease of maintaining such equipment, for example.

For purposes of ease of explanation, it is assumed that the set 16 of terminals 18-20 are all active terminals in the network 10 and initially communicate in the network via the base station 12 (the pre-handover base station). At least one of the base stations 12 and 14 and/or the terminals 18-20 are movable relative to each other. Consequently, the present base station 12 may be removed from service, such as being rotated out of service or otherwise may experience a disruption in service for at least some of the terminals 18-20. Thus, the network 10 is operative to implement a handover from one base station 12 to the other base station 14 in accordance with an aspect of the present invention.

By way of example, communications between the terminals 18-20 and the base station 12 is implemented using a frame-based architecture that includes slots or sub-slots assigned for communications to and from the respective terminals. For example, each terminal 18-20 is assigned a unique slot in which to transmit and receive data according to the communications protocol being implemented in the network 10. The slots can correspond to time slots, such as for time division multiplexing (TDM), time division multiple access (TDMA), or to frequencies or channels, such as for frequency division multiplexing (FDM), frequency division multiple access (FDMA), code division multiplexing (CDM) or code division multiple access (CDMA). The data contained in the slots can be transmitted in a layered data protocol, such as according to the OSI model, to facilitate stable communications of data between processes at the terminals 18-20 and base station 12.

For purposes of brevity and ease of explanation, the following example assumes a TDMA/TDM physical layer protocol for communications between the terminals 18-20 and base station 12. Those skilled in the art will understand and appreciate that other communications protocols could be utilized according to one or more aspects of the present invention. For example, signals (e.g., downlinks) 24 and 26 from the base station 12 to the terminals 18-20 correspond to TDM links and the signals 28 and 30 from the terminals to the base stations correspond to TDMA uplinks.

By way of further example, using the OSI Reference Model, the data link (or link) layer generally controls the way messages are sent through the network 10. The link layer facilitates transparent communication for the network layer and other higher level layers. The data link layer generally performs three main functions, including the flow control (e.g., when messages are sent), message delineation and error detection and control. The flow control function of the link layer includes synchronizing when a terminal 18 or 20 transmits a message to the base station so as to be received a the base station within its assigned slot.

As a result, the terminals 18-20 are programmed to intermittently or periodically transmit synchronization information (in the data link layer) to help maintain synchronization with the base station 12. For example, the terminals 18-20 provide intermittent or periodic timing information, such as a timing burst, in its assigned time slot of the TDMA uplinks 28 and 30. The periodic timing burst in the uplinks 28 and 30 operate as requests querying the base station 12 as to whether each respective terminal is adequately synchronized with the network 10. The network 10 thus can issue a network response via a return TDM downlink 24 and 26 indicating if timing adjustments are needed by the respective terminals. Other suitable low-level frame timing or synchronization information can be contained in the link layer of appropriate time slots of the TDM downlinks 24 and 26 based on which the respective terminals 1820 can synchronize to the network. The response from the base station, for example, can include instructions to advance or retard timing at the respective terminals.

In accordance with an aspect of the present invention, the network 10 is operative to implement handover for the set 16 of one or more active terminals 18-20 from the present or pre-handover base station 12 to a new or post-handover base station 14. In the frame based communications architecture, the handover is implemented using low level data, such as the data link layer. As mentioned above, the data link layer is used to maintain synchronization between the terminals 18-20 and their associated pre-handover base station 12.

Figure 2:
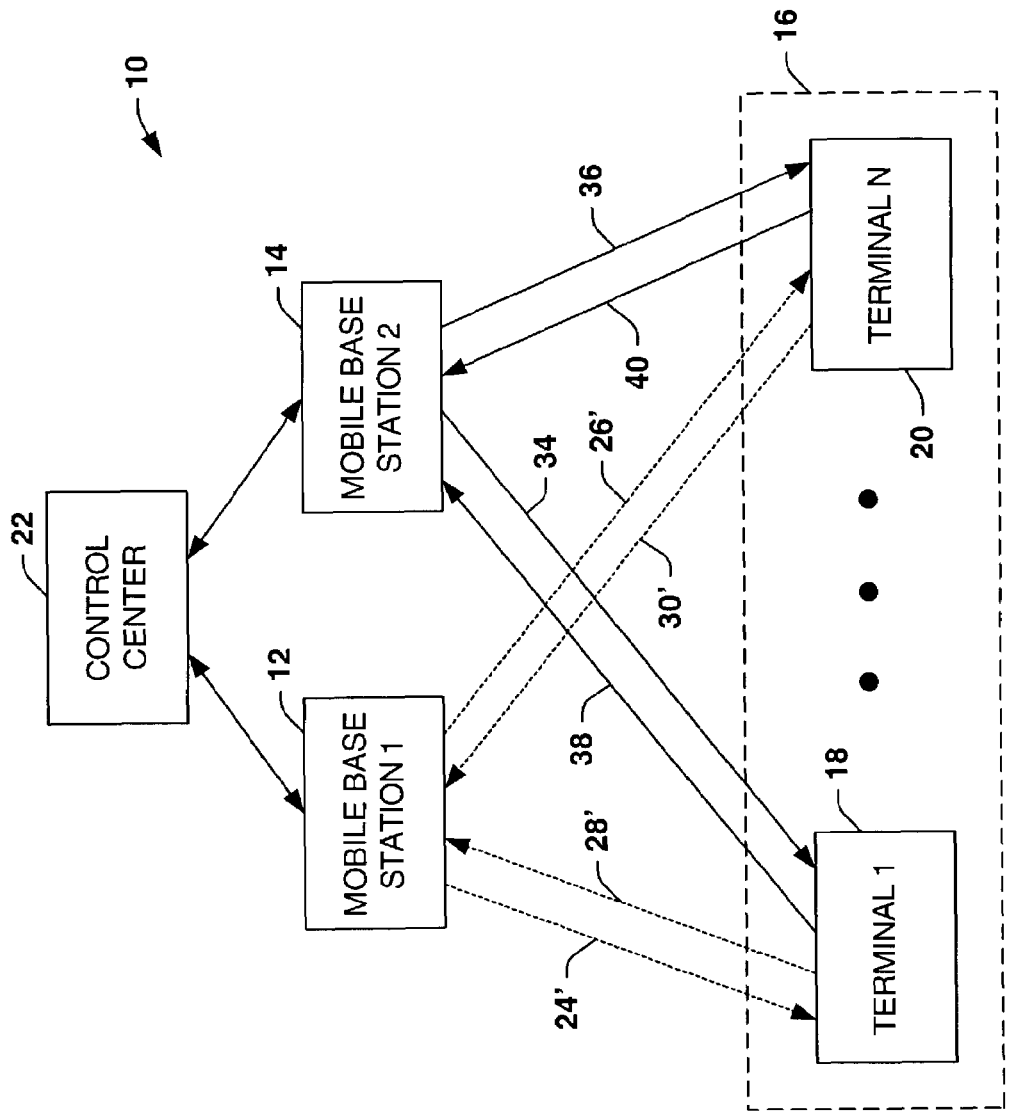
FIG. 2 illustrates the communications system of FIG. 1 implementing handover in accordance with an aspect of the present invention.

FIG. 2 illustrates an example in which the network is handing over communications for the set 16 of terminals 18-20 from the base station 12 to the base station 14. Thus, the post-handover station 14 transmits downlink signals 34 and 36 to the respective terminals 20-18. The control center 22, for example, provides the post-handover station 14 with requisite data (e.g., framing data, terminal ID's, slot assignments and so forth) to enable communications between the station and the terminals. The terminals 18-20 also communicate uplink signals 38 and 40, at least some of which are received by the post-handover base station 14. As shown by dotted lines and indicated by adding prime symbols, in certain circumstances, the terminals 18-20 can still send uplink signals 28' and 30' to be received by the pre-handover station 12. Additionally, the station 12 may transmit downlink signals 24' and 26' to the terminals, such as until handover is completed. The uplink signals 28' and 30' can be different from the uplink signals 38 and 40, although such transmissions could alternatively correspond to the same uplink transmissions received by different base stations 12 and 14.

During handover, the synchronization mechanism in the data link layer is further exploited to implement handover and acquire resources relative to the post-handover station 14. When operating in the handover mode, for example, the terminals 18-20 can suspend normal data traffic in the signals 38 and 40 and communicate synchronization information with the station 14. Normal traffic between the post-handover station 14 and the terminals 18-20 can be resumed, for example, after a predetermined period of time has expired (e.g., based on empirical studies), after a predetermined number of frames have been communicated, or after a certain percentage of the terminals that are being handed over have adequately synchronized with the new base station.

It is to be appreciated that because the set 16 of terminals 18-20 that are being handed over are already authenticated as users in the network 10 (e.g., active users), the handover can be completed for all or a portion of the terminals based on their synchronization with the new base station 14. It is possible that the handover may fail for some of the terminals 18-20 in the set 16 being handed over, such as in a mass handover event. For example, handover could fail for terminals located near the fringe of the coverage area for the post-handover base station 14, such as due to parallax differences. Accordingly, the terminals that are not able to synchronize properly in the time period permitted, can then implement a network layer handover, as is known in the art. It will be appreciated that for mass handover, efficiencies and resource conservation can be achieved by handing over such terminals to the new base station concurrently in accordance with an aspect of the present invention.

The terminals 18-20 being handed over can transition from a normal active mode to a handover mode. In the normal mode, the terminals communicate normal traffic between the terminals and the base station 12. In the handover mode, each of the terminals 18-20 synchronizes with the post-handover station 14. A transition from the normal active mode to the handover mode can occur at the terminals 18-20 based on concurrent signaling (e.g., of a broadcast message) from the network 10 to the terminals or based on the terminals themselves detecting conditions corresponding to handover.

According to an aspect of the present invention, handover can be implemented based on the network 10 (e.g., the control center 22) controlling the pre-handover platform 12 to stop transmitting and the new platform to begin transmitting to the terminals 18-20. In this scenario, each of the terminals 18-20 receiving a signal from the post-handover station 14 detects that its frame boundary is out of synchronization with the expected frame boundary in the received signals 34 and 36. Additionally or alternatively, the terminals 18-20 may detect a different frame ID from that expected in the time slot data. It will be appreciated that frame synchronization may exist, but a given time slot in the signaling 34, 36 may have shifted some integer number or frames due to the distance between the station 14 and the terminals 18-20. The direction and amount of such shifting will vary based on the relative position between the terminals and the station 14 as compared to the pre-handover station 12. In this case, such slot will have a different frame ID than expected for a transmission received from the old platform 12 (FIG. 1). When a terminal 18-20 detects such a framing discrepancy, the terminal can enter its handover mode, according to an aspect of the present invention, and employ the link layer to implement the desired synchronization, such as described herein.

For a more complex communications arrangement, the network 10 can implement signaling in the signals 24' and 26' from the pre-handover station 12 to the terminals 18-20 instructing the terminals to enter their handover mode. The pre-handover station 12 can broadcast a command to each of the terminals 18-20, such as a higher level broadcast message (e.g., in the network layer or higher). The broadcast message enables the terminals to transition from the normal mode to the handover mode. The complexity and quantity of information contained in the message can vary as a matter of design choice and processing capabilities. For example, the network message can alert the terminal equipment that is being handed over that a handover event is imminent. Additionally or alternatively, the network message can provide estimates of resynchronization parameters to facilitate the handover as well as provide for more general optimization at the terminals 18-20.

By way of further example, the terminals 18-20 can estimate the resynchronization (e.g., an initial coarse estimate) as a function of position information, velocity information, or a combination thereof, received in the network handover message for the post-handover platform. The terminals can subsequently perform finer synchronization depending upon the accuracy of the initial estimates. The fine synchronization, in turn, can enable a rapid convergence to synchronization for each terminal. Those skilled in the art will understand and appreciate various types of other information that can be included in a network handover message that can facilitate an estimation of a timing adjustment at each of the terminals being handed over. Typically, there will be an exchange of one or more messages between the terminals 18-20 and the post-handover base station 14.

By way of further example, a network handover message can also implement a new frequency scheme or plan, such as to facilitate optimization in communication between the terminals being handed over and the new base station 14. For example, because the relative position between the terminals 18-20 being handed over and the new base station 14 can differ from the arrangement between the terminals and the prior base station 12, time slots can be reassigned and frequency resources can be optimized based on adjustments made by the control center 22 of the network 10. Another aspect of the message can set a duration for the handover mode in which the terminals are not to transmit or receive user data traffic. The duration can be a period of time or a set number of frames during which normal data traffic is to be suspended.

In accordance with another aspect of the present invention, in a network in which the terminals 18-20 have dual channel capabilities, the terminals can continue transmitting with the old station 12 over one channel and concurrently begin synchronization with the new station 14 over another channel. This dual transmission scheme results in an overlap of communication between the old and new platforms, such that data traffic can be communicated through the old platform until the handover to the next platform can be completed. The handover for each of the terminals 18-20 can thus occur concurrently or at different times depending on when the terminals are adequately synchronized with the post-handover station 14. The concurrent multi-channel transmissions by the terminals 18-20 that are being handed over can occur, for example, concurrently at different frequencies (TDM, TDMA) or at different channels or codes (CDMA). In the messages communicated to the new base station 14, the terminals 18-20 can send empty frames together with resynchronization information in the link layer (e.g., timing bursts), as described herein.

In order to facilitate synchronization between the terminals 18-20 and the post-handover base station 14, each of the terminals can itself be programmed and/or configured to estimate or predict timing adjustments. Each of the terminals 18-20, for example, can employ an internal clock and predict or estimate a time when each terminal would have expected a time slot from the pre-handover station 12. When a terminal receives a response from the post-handover base station 14, the terminal compares the expected time with the actual received time and, based on the comparison, adjusts frame timing for the terminal. For example, each terminal can be programmed to compute a difference between the expected frame timing from the pre-handover station 12 and the actual frame timing from the post-handover station 14. The difference corresponds to a timing adjustment that will enable the terminals 18-20 to synchronize with the post-handover station 14.

Additionally, the terminals 18-20 can implement more precise (or finer) adjustments to help synchronize frame timing based on a network response to each of the terminals' timing burst. The post-handover station 14 can provide the network response for each terminal, for example, as link layer synchronization information. The synchronization information, for example, can indicate in which direction timing should be adjusted, such as to advance or retard timing. In certain implementations, the synchronization information in the network response from the station 14 can indicate an amount (e.g., in microseconds or milliseconds) by which each respective terminal 18-20 should adjust its timing.

Figure 3:
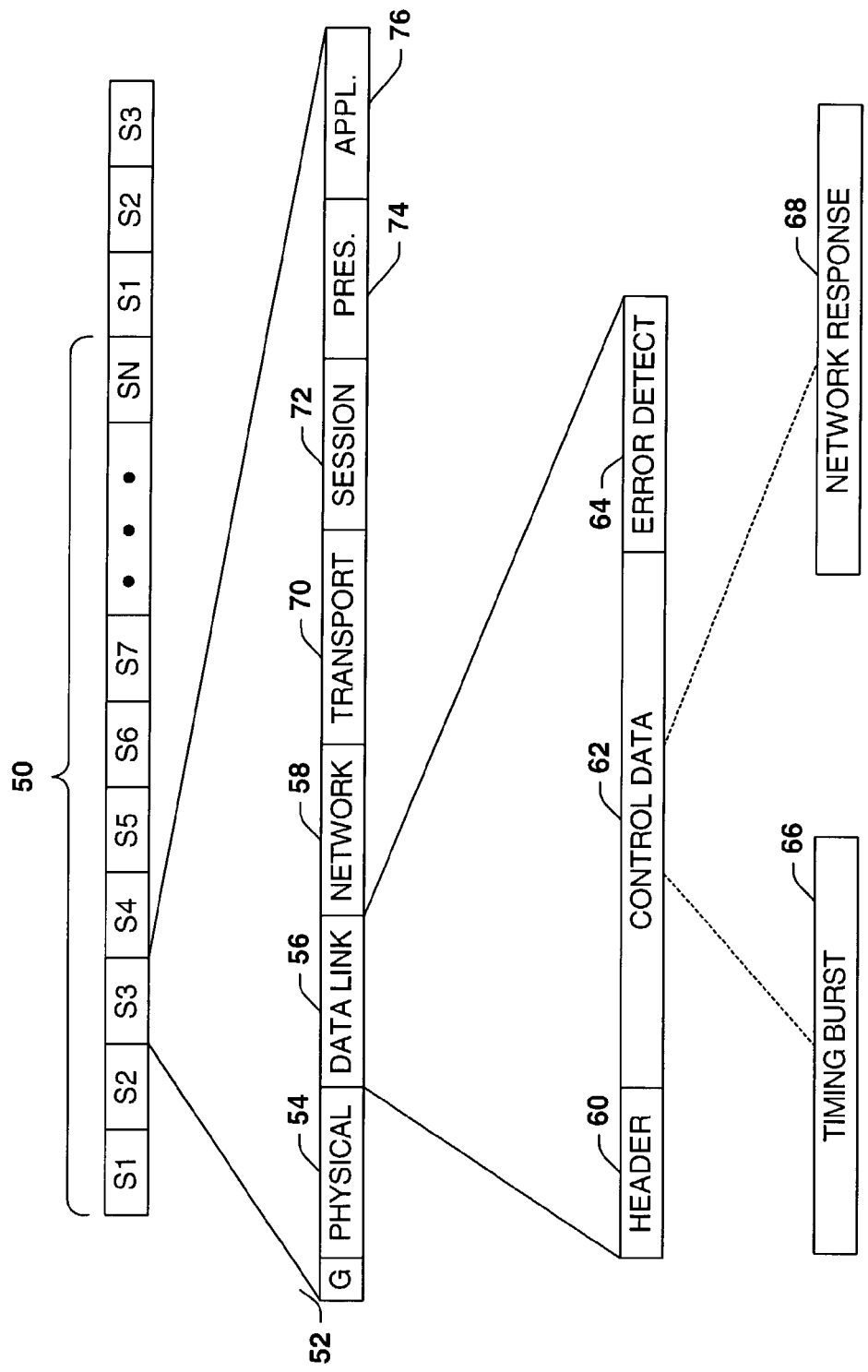
FIG. 3 is an example of a communications model that can be utilized to implement handover in accordance with an aspect of the present invention.

FIG. 3 is an example of a frame based model, such as can be utilized in a network operative to implement handover in accordance with an aspect of the present invention. In this example, a frame 50 includes a plurality of slots S1 through SN, where N is an integer greater than 1. Each of the slots can be time slots, such as associated with a time division multiplexing (TDM) or time division multiple access (TDMA), architecture. It is also to be understood and appreciated that the slots could correspond to channels or bands, such as associated with code division multiple access, frequency division multiplexing or frequency division multiple access. Typically, each terminal is assigned at least one slot in which it can communicate data relative to the base station with which it is associated in the network. Each slot S1-SN includes a plurality of layers according to a predefined communications protocol. In the example of FIG. 3, time slot S3 has been expanded to illustrate various layers contained in the slot according to the OSI reference model. It is appreciated that each of the other slots in each respective frame can be similarly configured. Slot S3 and each of the slots includes a guard band 52, which provides a safety margin against symbol interference in the time between adjacent time slots.

Slot S3 also includes a physical layer 54 which provides a protocol that defines the lowest level of communication between devices in the network, such as to enable a raw bit stream surface in the network. The next layer is a data link layer 56 which attempts to make the physical raw bit stream of data reliable. Various standards exist for the data link layer including LLC, HDLC, LAPB, LAPD, to name a few.

The principle service provided by the link layer 56 is error detection, control, and synchronization. By way of example, three common error detection methods are parity checking, longitudinal redundancy checking, and polynomial checking (particularly checksum and cyclic redundancy checking). The link layer 56 can also manage channel access and flow control as well as ensure correct sequence in transmitted data. It also may correct errors that occur in the physical layer 54 without using the functions of the upper layers. Thus, the next higher layer, the network layer 58, can assume virtually error-free transmission over the communications link. Also included in the link layer 56 are framing and synchronization data, such as for providing flow control of data.

In FIG. 3, the link layer has been expanded to show a header 60, control data 62 and error detection data 64. The header, for example, indicates what type of control data is being provided at 62. For example, the header 60 can include an ID, such as a data word, indicating that the control data 62 is to be used for timing or synchronization of the slot S3 in the frame 50. In particular, the header 60 can also specify attributes of the synchronization data, such as a timing burst 66. The timing burst 66, for example, can be utilized for maintenance synchronization. Terminals perform maintenance synchronization intermittently or periodically to help ensure proper synchronization of respective time slots in the framing structure used for communication between a terminal and a base station. Additionally or alternatively, the timing burst 66 can be provided in a handover mode when the terminal is being handed over from a pre-handover base station and a post-handover station in accordance with an aspect of the present invention.

A base station receiving control data 62 that includes synchronization data, such as the timing burst 66, can in turn provide a network response 68 to the timing burst also in the data link layer 56. The network response 68 can specify a synchronization or timing adjustment to be made by the terminal in order to achieve proper synchronization with the network. For example, the network response 68 to the terminal can include an indication to retard or advance its timing accordingly. One or more exchanges of such messages (timing bursts and network responses) between each of the terminals being handed over and the post-handover base station can occur in order to achieve suitable synchronization. This message exchange in conjunction with timing estimates (or predictions) made by the terminals facilitates synchronization for handover events according to an aspect of the present invention.

When a terminal receives a network response from the base station indicating that timing should be adjusted, such as advanced or retarded, the terminal makes a determination as to whether the adjustment is due to a drift in its internal clock timing or due to a shift in distance such as due to movement of the terminal and/or movement of the base station. This determination of the basis for the timing adjustment will vary depending on whether a handover event is being implemented. Specifically, during handover, the terminal (e.g., operating in the handover mode) can assume that a timing difference between the actual and predicted timing difference is due to a shift in the distance between the terminal and the base station. Accordingly, the terminal will adjust its frame timing when to send the timing burst and usually not adjust its clock.

By way of further example, if a terminal detects the beginning of the frame arrives before expected, indicating an error due to a change in the distance and/or during a handover event, the terminal adjusts the transmission time in the opposite direction in which the detected shift in timing occurs. For example, the terminal can compute a difference between the actual and expected times. Thus, if the beginning of a frame arrives before expected, based on the predicted timing, the terminal will delay its transmission according to the computed difference so that the next timing burst does not arrive early at the base station. As mentioned above, the amount of adjustment can be based on information provided in the response from the base station or based on solely upon the computed difference between the actual and predicted transmit times. Such prediction or estimation by the terminal facilitates resynchronization and handover in accordance with an aspect of the present invention. It will be appreciated that such resynchronization is facilitated because the terminal can make a gross (or coarse) adjustment based on the comparison of the actual and predicted transmit times for the timing bursts.

Referring again to FIG. 3, the network layer 58 generally provides for the transfer of data between transport entities such as base stations and terminals and/or the control center. The network service is responsible for establishing, maintaining and terminating connections across the intervening communications facility, such as provided by the data link layer 56. The protocol also can include a transport layer 70 that provides a reliable mechanism for the exchange of data between processes in different systems. The transport layer 70, for example, ensures that units of data are delivered in an error free sequence. The transport layer 70 also can be concerned with optimizing the use of network services and providing a desired quality of service to the session entities, as is known in the art.

A session layer 72 can provide a mechanism for controlling the dialogue between presentation entities. For example, a session layer provides a means for two presentation entities or processes to establish and use a connection, usually called a session. The presentation layer 74 offers application programs and terminal handler programs a set of data transformation services, which can include data translation, formatting and syntax selection. Finally, an application layer 76 provides a means for application processes to access the OSI model. The application layer 76 can contain management functions and other mechanisms to support distributed applications and other user oriented protocols.

Figure 4:
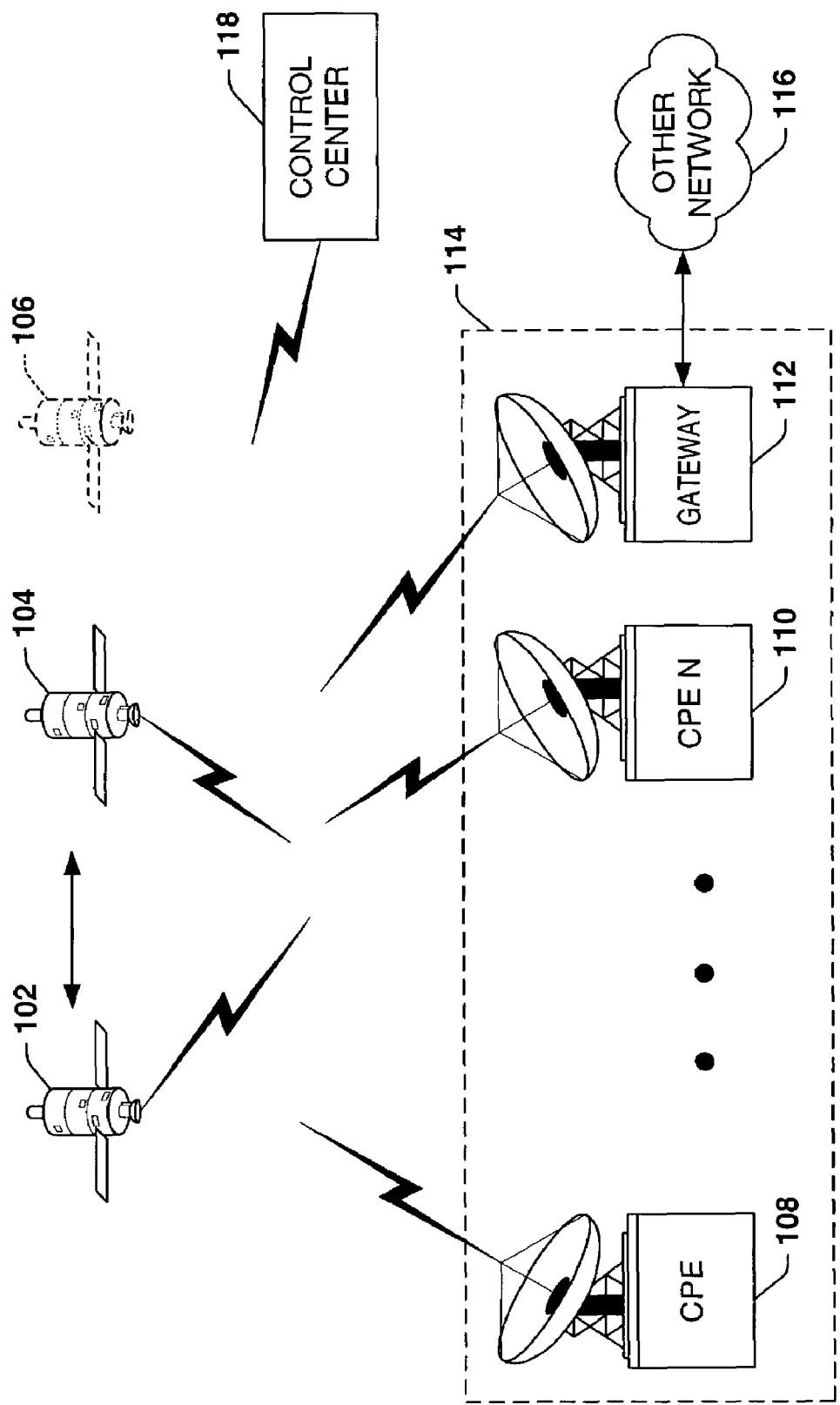
FIG. 4 illustrates a satellite communications system operative to implement handover in accordance with an aspect of the present invention.

FIG. 4 is an example of a communications network 100 operative to implement handover in accordance with an aspect of the present invention. The network 100 includes a plurality of non-terrestrial mobile platforms 102, 104 and 106, which can be space borne base stations (e.g., satellite), air borne base stations (e.g., manned or unmanned aircraft) or a combination thereof. A plurality of consumer premises equipment (CPE) 108, 110 and 112 form a set of CPEs 114, each of which is programmed and configured to implement a handover in accordance with an aspect of the present invention. In this example, the CPE 112 operates as a gateway to access another network 116, such as a computer network (e.g., global network or LAN) or a telecommunications network (e.g., public telephone switched network (PTSN)). The network 100 also includes a control center 118, which can be a terrestrial or non-terrestrial station or can be implemented in one or more of the stations 102-106 or the CPEs. The control center 118 is programmed and/or configured to manage network resources as well as control other aspects relating to operation of the network 100.

For purposes of example, it assumed that the set of CPEs 106, 108 and 110 are initially communicating with the network 100 via platform 102. The network assigns each of the CPEs 106-110 to a time slot, and each CPE employs its link layer to maintain proper synchronization while operating in an associated normal active mode. Thus, the platform 102 receives data transmitted from each of the CPEs in their assigned time slots located within respective guard bands in the communications frame.

In accordance with an aspect of the present invention, a mass handover event for the set 114 of CPEs 106-110 is being implemented from the platform 102 to a next platform, namely platform 104. Such a mass handover event can occur when the platform 102 the set of terminals 106-110 is to be handed over to the different platform 104. This can occur, for example, as a satellite platform moves in its orbit to a position where it is unable to communicate with the set 114 of terminals 108-112. Alternatively, the platform 102 can be removed from service for maintenance or other reasons. For example, an airborne aircraft operating as a base station for the network 100 may be rotated out of services for refueling or to perform maintenance.

As mentioned above, various approaches can be utilized to implement a mass handover event according to an aspect of the present invention. Each approach employs low level synchronization procedures (e.g., in the data link layer) implemented by each of the terminals 108-112. By way of example, each of the terminals 108-112 is operative to predict or estimate a time when each of the terminals would have expected to receive a message (e.g., in the assigned time slot) from the pre-handover platform 102. The terminals 108-112 receive a response from the post-handover platform 104 during a handover event, such as in response to a timing burst. By comparing the estimated receipt time and the actual time the message is received from the new platform 104, each of the terminals can compute a difference between the expected frame timing from the pre-handover platform 102 and the frame timing from the post-handover platform 104. The computed difference corresponds to a timing adjustment that enables each of the terminals 108-112 to synchronize with the post-handover platform 14. The terminals 108-112 can also implement more precise (or finer) adjustments to help synchronize frame timing, such as based on data contained in a network response. The network response, which the post-handover platform 104 may provide as link layer synchronization information, can indicate in which direction and an amount by which timing should be adjusted for each terminal.

By way of further example, a handover event can be initiated in response to the network 100 (e.g., the control center 118) controlling the pre-handover platform 102 to stop transmitting and the new platform 104 to begin transmitting to the terminals 108-112. In this basic approach, each of the terminals 108-112 detects the handover event by noticing that its respective frame boundary in received signals is out of synchronization with the expected frame boundary. Additionally or alternatively, the terminals 108-112 may detect a different frame ID from that expected in the time slot data, which can be in addition to a frame shift. When such framing discrepancies are detected at the terminal 108-112, each terminal can enter its handover mode, according to an aspect of the present invention, to employ the link layer to implement the desired synchronization, as described herein.

For a more complex communications arrangement, the network 100 can implement some signaling to instruct the terminals that are to be handed over to enter the handover mode. Such network messaging can be provided as a higher level broadcast message (e.g., network layer or higher) that is broadcast to each of the terminals being handed over. As mentioned above, the complexity and quantity of information contained in the message can vary as a matter of design choice, processing capabilities and available resources in the network 100.

Additionally or alternatively, in a network in which the terminals 108-112 have dual channel capabilities, the terminals can continue transmitting with the old platform 102 and concurrently begin synchronization with the new platform 104. This dual transmission scheme results in concurrent terminal communication with both of the platforms. Consequently, data traffic can be communicated through the old platform 102 until the handover to the next platform 104 can be completed.

While the foregoing example in FIG. 4 has been described as a mass handover event in which all of the terminals 108-112 are handed over to a common new platform 104, it will be understood and appreciated that different subsets of the CPEs 108-112 can be handed over to different new platforms. For example, a first subset of the CPEs can be handed over to the platform 104 and a second group or subset of the CPEs can be handed over to a different platform 106. Such a split-handover or allocation of resources may be considered necessary where no single base station is positioned to provided adequate coverage for the terminals being handed over. For instance, different subsets of terminals 108-112 can be handed over to different base stations where the pre-handover satellite 102 is in a highly elliptical orbit that provides coverage to a large area. In this situation, as the station 102 moves out of service, two or more other platforms 104-106 (e.g., satellites or aircraft) may be required to provide adequate service for the set of terminals 106-110.

Thus, those skilled in the art will understand and appreciate that by implementing the handover via synchronization in the data link layer, the individualized higher-level signaling and associated processing typically required in a conventional network layer is mitigated. As mentioned above, a broadcast message by the network 100 to all the terminals concurrently can be utilized to facilitate handover in accordance with an aspect of the present invention.

Figure 5:
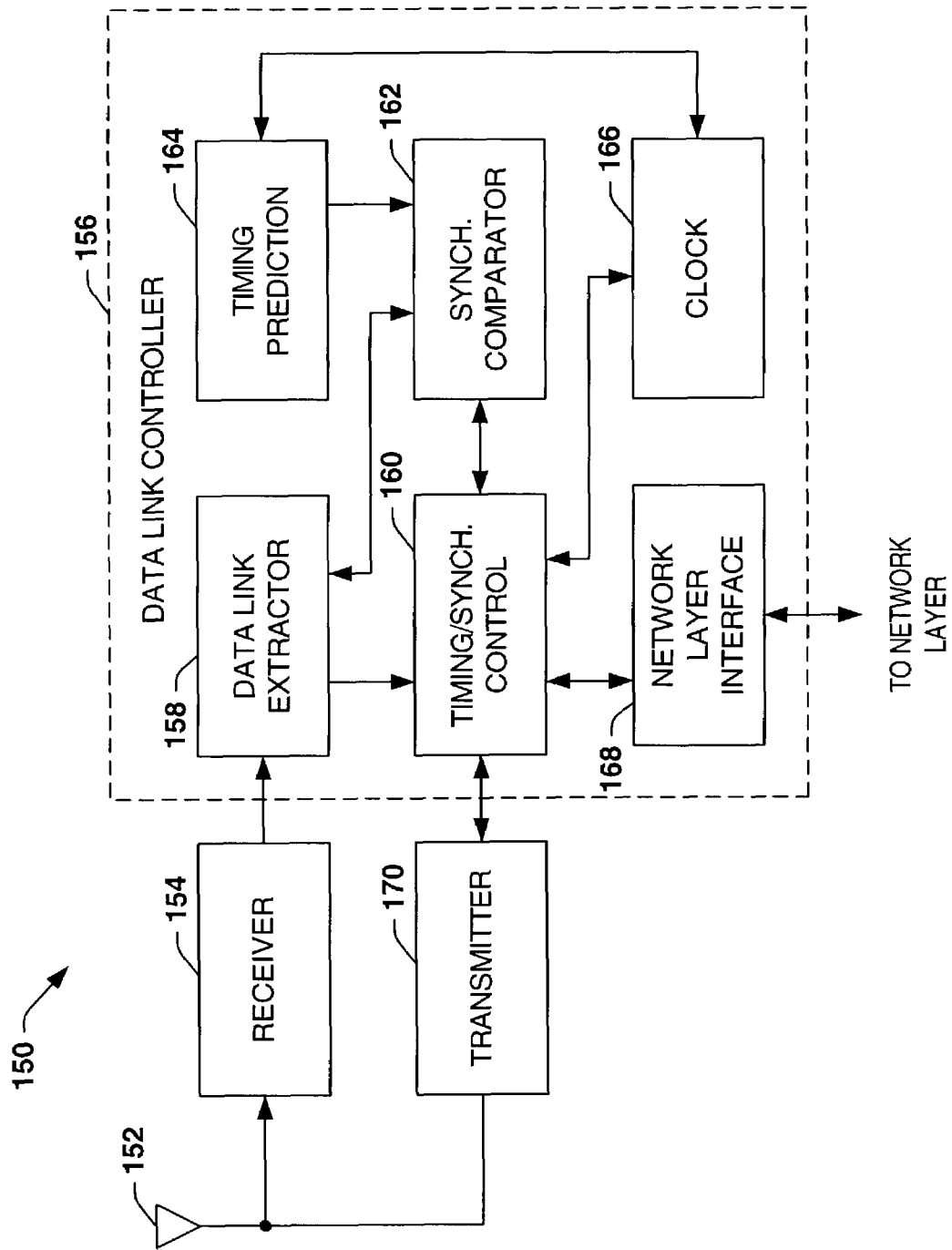
FIG. 5 is a schematic block diagram of a terminal operative to implement handover in accordance with an aspect of the present invention.

FIG. 5 is an example of a block diagram of a user terminal or CPE system 150 that can be utilized to facilitate handover in accordance with an aspect of the present invention. The system 150 includes an antenna 152 that can be used to transmit or receive data relative to the system. While a single antenna 152 is illustrated in FIG. 5, it is to be appreciated that different antennas could be used for transmitting received functions. Those skilled in the art will appreciate various antenna configurations and designs that could be utilized.

For an incoming signal, a receiver 154 receives the incoming signal for the antenna 152 and demodulates the signal to an appropriate electrical signal having associated data, such as according to the model shown and described in FIG. 3. The receiver 154 can include a demodulator and various filters operative to provide demodulated data to a data link controller 156. The receiver 154 thus is programmed and/or configured to convert the wireless signals to a corresponding electrical signal according to the particular communications protocol being utilized (e.g., TDM, CDM etc.). An analog to digital converter (not shown), which can be implemented in the receiver, in the data link control or as an intervening converter, converts the analog demodulated signal to digital data.

The data link controller 156 is programmed and/or configured to process and control the data link layer for incoming and outgoing transmissions. In particular, the data link controller 156 is operative to implement synchronization between the system 150 and its associated network using information transmitted in the link layer of the communications model. Such synchronization can include maintenance synchronization with a currently associated base station. Additionally, such synchronization can include synchronization with a new (post-handover) base station in response to a handover event implemented in accordance with an aspect of the present invention. The data link controller 156 can also include other functions, such as to implement error detection, error correction and flow control as is known in the art.

Referring to the contents of the data link controller 156, it includes a data link extractor 158 that receives the demodulated (digital) data corresponding to the signals received at the receiver 154. The data link extractor 158 is coupled to a timing/synchronization control module 160. The timing/synchronization control 160 maintains a data structure for enabling control of timing and framing parameters for the system 150, such as may be defined by the network to which this system is associated. The data link extractor 158 is operative to parse the received data, including the time slot(s) assigned to the system 150, and to extract a network response or other data pertinent to synchronization and timing for the system 150.

For example, a network response received from a satellite or other platform can include synchronization information. Such synchronization information can include an indication as to a timing adjustment, such as to advance or retard timing, to facilitate synchronization between the system 150 and the base station with which it is communicated. As described herein, such information is contained in a data link layer of the communications model. The data link extractor 158 provides extracted synchronization data to a synchronization comparator 162. The synchronization comparator 162 also receives an estimate or predicted timing value from a timing prediction component 164. The timing prediction component 164, for example, is programmed to predict or estimate for frame timing. The estimate of frame timing, for example, can correspond to when a response in is expected to be received its assigned time slot from the base station. This estimate, for example, can be based on stored historical framing data (e.g., from one or more previous message exchanges), be computed based on known position information, or be derived by employing a suitable timing algorithm.

By way of example, during handover, the timing prediction component 164 can predict when the synchronization information would arrive if it were to be transmitted from the pre-handover platform. The synchronization comparator 162 then compares the predicted time value with the actual arrival time of the synchronization information from the post-handover platform. The comparator 162 provides the result of the comparison to the timing/synchronization control 160. The timing/synchronization control 160 computes a suitable timing correction to adjust the transmission time for the timing burst based on the comparator results. The timing/synchronization control 160 can also employ synchronization information contained in the network response in the data link layer time to facilitate resynchronization with the network.

The data link controller 156 also includes an internal clock that provides the timing basis for the system 150. The internal clock 166 is synchronized with the network to provide global synchronization. The timing/synchronization control 160 can adjust the internal clock 166, such as in situations where the clock has drifted relative to the network. As mentioned above, the timing/synchronization control 160 makes a determination as to whether the adjustment is due to a drift in its internal clock timing or due to a shift in distance such as due to movement of the system 150 and/or movement of an associated base station. The basis for the timing adjustment thus will vary depending on whether a handover event is being implemented. Specifically, during handover, the terminal (e.g., operating in the handover mode) can assume that a timing difference (indicated by the comparator 162) between the actual and predicted timing is due to a shift in the distance between the terminal and the base station.

The data link controller 156 also includes a data interface 168 that is operative to receive data from and send data to other layers or components (not shown) of the system 150. The data interface 168 thus receives higher level data, such as from the network layer. The data interface 168 can buffer data received from the other layers while operating in the handover mode. Alternatively or additionally, the data interface 168 can alert the other layers to suspend transmission of data until synchronization has been completed. As described herein, the completion of synchronization between the system 150 and the network can be determined by the timing/synchronization control 160 or, alternatively, by the network itself. After handover has been completed, the timing/synchronization control 160 can provide user data (e.g., from the data interface 168) to the transmitter 170 for synchronized transmission to the post-handover platform.

The network or the post-handover base station can discern whether adequate synchronization has been achieved based on the amount of adjustments required in the network response for a given system 150. Alternatively, the determination can be made based on empirical data, which is used to define a predetermined duration for implementing such synchronization for a handover event. As mentioned above, the link layer synchronization procedure, as described herein, might be insufficient to synchronize all terminals, such as with the network in the allotted time period, such as in a mass handover event. In such situations, higher level synchronization mechanisms can be utilized for individual terminals unable to achieve adequate synchronization.

Figure 6:
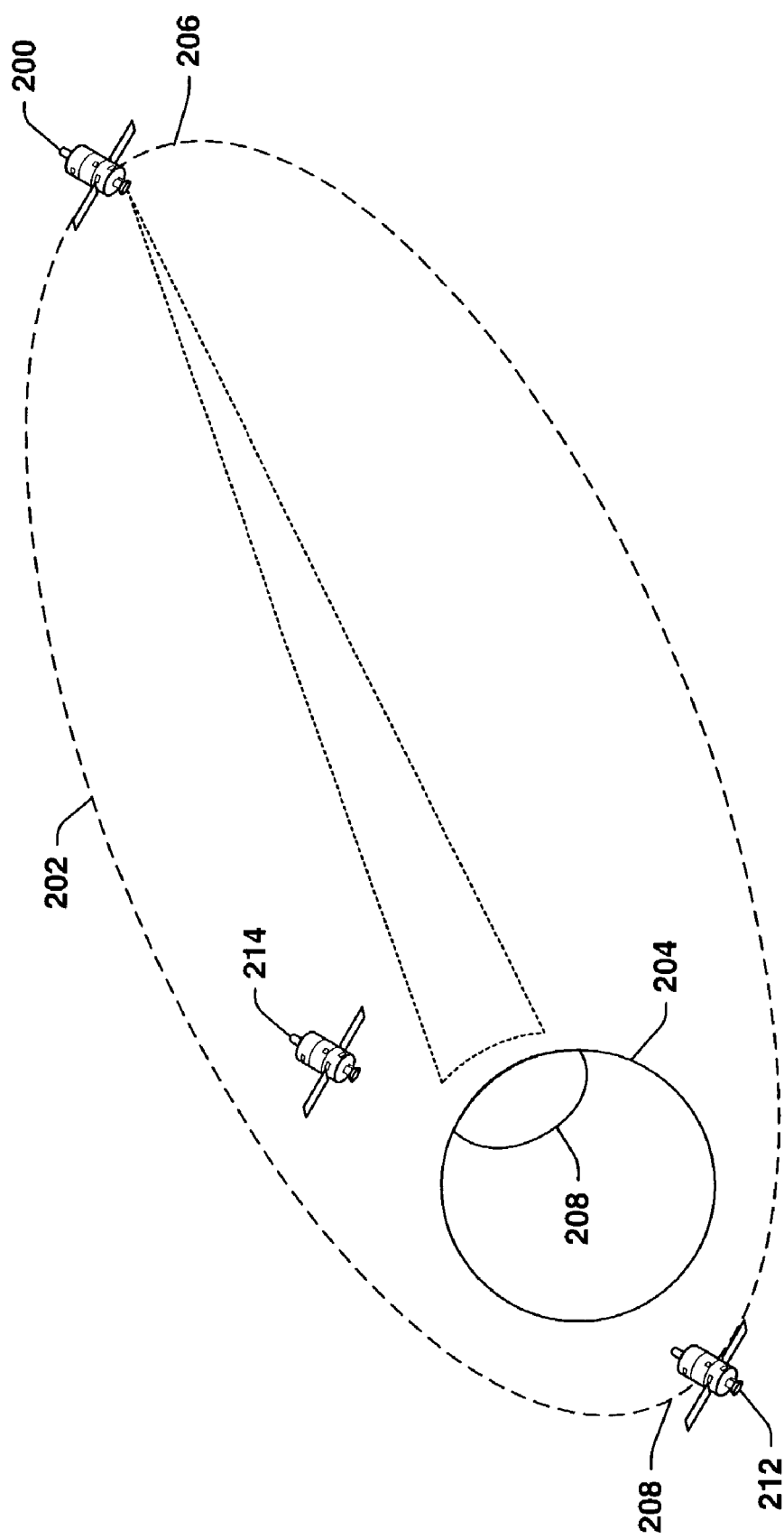
FIG. 6 illustrates an example of a satellite system operative to implement handover in accordance with an aspect of the present invention.
Figure 7:
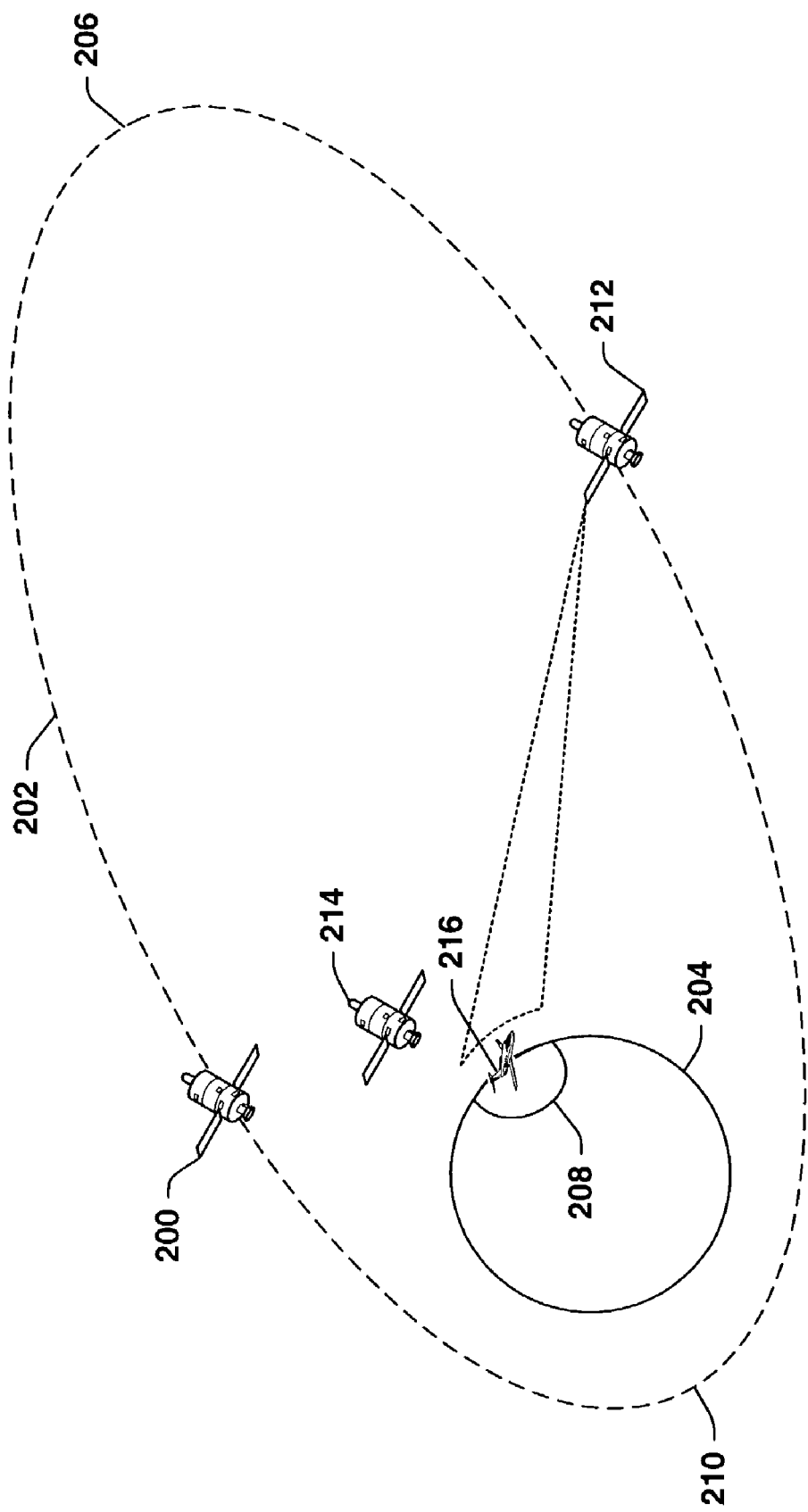
FIG. 7 illustrates an example of the satellite system of FIG. 6 in a another condition in accordance with an aspect of the present invention

FIGS. 6 and 7 illustrate an example of a satellite 200 in a highly elliptical orbit (HEO) 202 relative to the earth 204. As is known in the art, in a HEO orbit, the satellite 200 moves slowly at apogee 206, and thus is able to provide substantially stable telecommunications for its coverage area for a majority of its orbit, as shown in FIG. 6. As the satellite 200 moves in its orbit toward perigee 208, the satellite moves much more quickly in its orbit 202 around the earth 204 and is unable to provide telecommunications coverage for its coverage area, such as depicted in FIG. 7.

As shown in FIG. 7, during the period in which the satellite 200 no longer can provide suitable coverage to CPEs in the coverage area 208, the communications can be handed over to one or more other platforms (e.g., satellites or aircraft) 212, 214, 216 in accordance with an aspect of the present invention. In this example, it is assumed that there are a plurality of customer premises equipment that will need to be handed over concurrently as the satellite 200 moves toward its perigee. For example, the platform 212 is depicted as another satellite traveling in the same (or a different) HEO generally offset from the satellite 200. While two satellites 200 and 212 are depicted in the HEO 202, those skilled in the art will understand and appreciate that several satellites in elliptical orbit can be used to provide substantially stable and permanent telecommunications for the coverage area 208. In order to maintain communications for the coverage area 202, as the satellites move along the HEO 202, handover is implemented for the CPEs, as described herein, in accordance with an aspect of the present invention.

Alternatively or additionally, one or more other satellites 214 can travel in other types of orbits (e.g., a low earth orbit, a geosynchronous orbit) and, in turn, be controlled to provide post-handover coverage when the satellite 200 (or other platform) is unable to provide coverage to the area 208. Then, as the satellite 200 moves toward apogee, communications can be handed back over to the satellite 200 for providing communication to the coverage area 208.

By implementing handover in accordance with an aspect of the present invention, it will be appreciated that such handover can be implemented for a plurality of CPEs efficiently with reduced bandwidth requirements than conventional handover techniques. The satellite or satellites to which handover can be implemented can be in a highly elliptical orbit or other orbits such as a low earth orbit or a geosynchronous orbit. It is to be appreciated that all the CPEs in the coverage area 208 can be handed over to the same or to a plurality of different satellites so that substantially stable telecommunications can be provided for the coverage area on a permanent basis.

Figure 8:
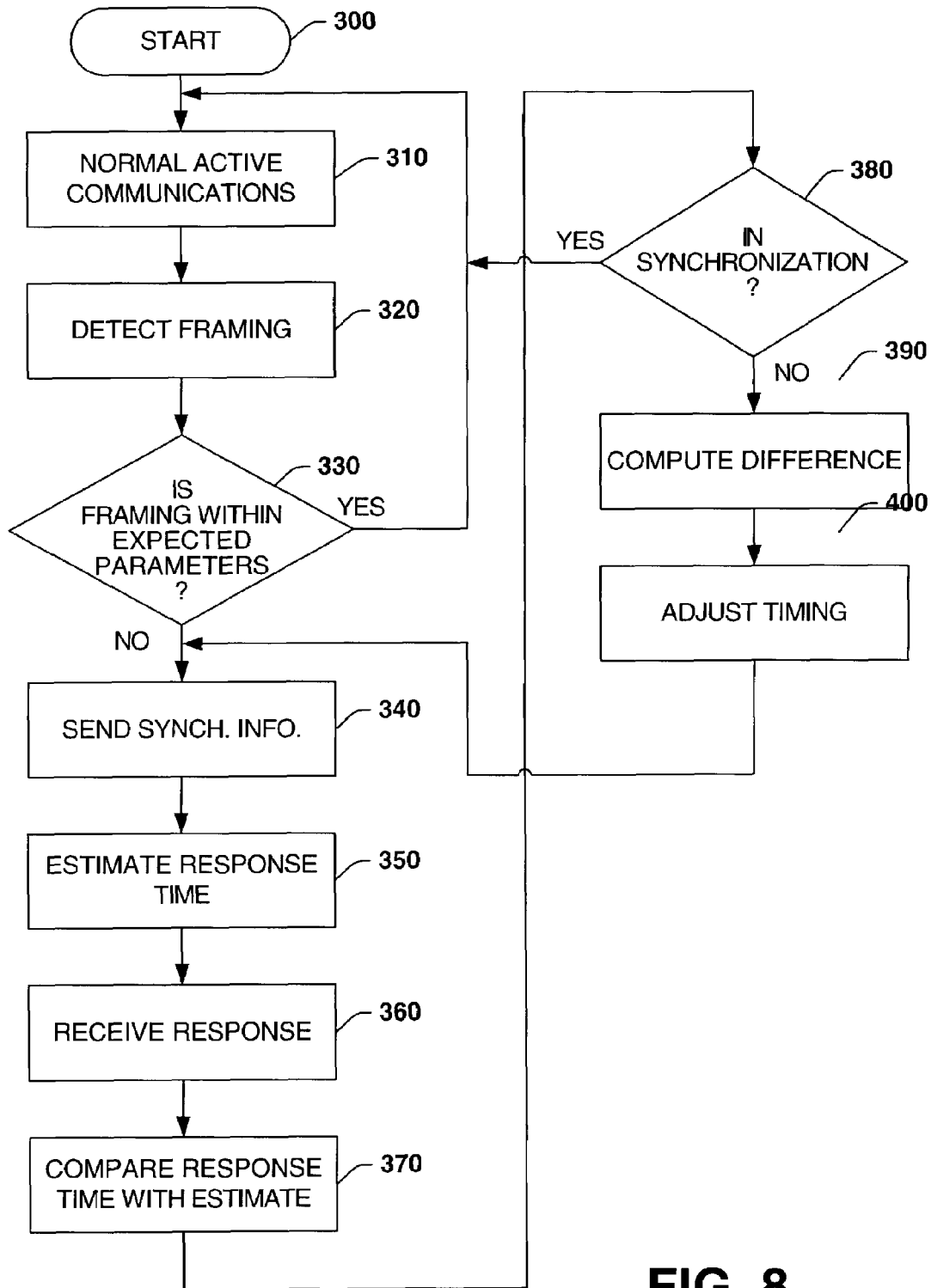
FIG. 8 is a flow diagram illustrating a methodology for implementing handover in accordance with an aspect of the present invention.

In view of the examples shown and described above, a methodology that can be implemented in accordance with the present invention will be better appreciated with reference to the flow diagrams of FIG. 8. While, for purposes of simplicity of explanation, the methodology is shown and described as a executing serially, it is to be understood and appreciated that the present invention is not limited by the order shown, as some aspects may, in accordance with the present invention, occur in different orders and/or concurrently from that shown and described herein. Moreover, not all features shown or described may be needed to implement a methodology in accordance with the present invention.

FIG. 8 illustrates a methodology for implementing handover in accordance with an aspect of the present invention. The methodology can be implemented as software, hardware, or a combination of both, such as at a terminal or CPE in a wireless communications network. The methodology begins at 300, such as in connection with the terminal system being connected and authenticated for active communications in the wireless network, as is known in the art. Once resources have been allocated and acquired, such as can include assigning and synchronizing transmissions from the terminal in an assigned time slot, the methodology proceeds to 310.

At 310, normal active communications continue. This can include bi-directional communications over one or more channels, time slots or frequencies depending on the communications protocol being utilized. Part of the normal active communications (310), can also include maintenance synchronization in which a timing burst that contains synchronization information is transmitted periodically or intermittently to an associated base station in the communications network. The network provides a network response to the timing burst, which response can contain a timing adjustment, such as to retard or advance timing for the terminal system. Thus, the terminal can utilize the network response to adjust its framing appropriately at 320.

At 330, a determination is made as to whether framing is within expected normal operating parameters. If this determination is positive, the methodology returns to 310 to continue normal active network communications. If the determination is negative, the methodology proceeds to 340. The determination at 330 can be made based on the amount of framing adjustment indicated in network response or based on a frame ID different from that expected in a received time slot or in response to a network message broadcast to a plurality of terminals that are to be handed over for communications with a new platform in the network.

At 340, which can correspond to entering a handover mode, synchronization information is sent. The synchronization information, for example, can include a timing burst that requests a network response. At 350, a network response time is estimated. The estimate can be based on prior response times with the pre-handover station or be computed based on position information, for example. An internal clock, which is synchronized with the network, can provide a timing basis for estimating the time when to expect receipt of a time slot from the pre-handover station 12.

When a terminal receives a response from the post-handover base station 14, the terminal compares the expected time with the actual received time and, based on the comparison, adjusts frame timing for the terminal. For example, each terminal can be programmed to compute a difference between the expected frame timing from the pre-handover station 12 and the actual frame timing from the post-handover station 14. The difference corresponds to a timing adjustment that will enable the terminals 18-20 to synchronize with the post-handover station 14.

At 360, a response is received such as from the post-handover station to which communication is being handed over. At 370, the time the response is received is compared with the response time estimated at 350. At 380, a determination is made as to whether, based on the comparison at 370, the terminal system is adequately synchronized with the network. If the system is synchronized with the network, the methodology can return to 330 in which normal active communications can be resumed. In the event that the terminal and the network are not adequately synchronized, the methodology proceeds to 390.

At 390, a time difference between the actual response time and the estimated response time is computed. The results of the computation at 390 correspond to a timing adjustment for the terminal. At 400, the frame timing for a transmission in the terminal are adjusted based on the computation at 390. Additionally or alternatively, a finer level of framing adjustment can be implemented, such as based on link layer synchronization information in a network response received from the post-handover platform. The synchronization information, for example, can indicate in which direction timing should be adjusted, such as to advance or retard timing. In certain implementations, the synchronization information can also indicate an amount (e.g., in microseconds or milliseconds) by which the terminal is to advance or retard its frame timing.

From 400, the methodology then returns to 340 to repeat the foregoing steps for finer, more precise synchronization to enable post-handover communications. It will be understood and appreciated that the methodology can be repeated several times so that link layer synchronization can be utilized to synchronize the terminal adequately with the network.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. In a wireless communications network having a plurality of terminals synchronized for network communications via a pre-handover base station, a method to facilitate handing over communications for at least one terminal of the plurality of terminals from the pre-handover base station to a post-handover base station, the method comprising:

transmitting from the at least one terminal a signal having timing information associated with the at least one terminal;

estimating an expected time for receiving at the at least one terminal a response to the transmitted signal from the pre-handover base station;

receiving at the at least one terminal a response to the transmitted signal from the post-handover base station at an actual time;

comparing the expected time relative to the actual time the response was received; and adjusting timing for subsequent signal transmissions from the at least one terminal based on the comparison to facilitate synchronization of the one terminal with the post-handover base station; and computing a difference between the expected time and the actual time the response is received at the at least one terminal, the timing for the subsequent signal transmissions from the at least one terminal being adjusted based on the difference, wherein the response to the transmitted signal received by the at least one terminal from the post-handover base station further comprising synchronization information for adjusting the timing for the subsequent signal transmissions so as to facilitate synchronization of the at least one terminal with the post-handover base station.

2. The method of claim 1, the timing information and the response further comprising data in a data link layer of a communications model employed for the communications network.

3. The method of claim 1, the synchronization information further comprising information indicative of at least one of position and velocity for the post-handover base station in the communications network.

4. The method of claim 1, the synchronization information further comprising an indication for the at least one terminal to advance or retard timing in performing the timing adjustment.

5. The method of claim 1, further comprising entering a handover mode at the at least one terminal in response to detecting a handover event based on the comparison.

6. The method of claim 5, further comprising detecting the handover event at the at least one terminal based on a discrepancy in framing information in a signal received from the post-handover base station.

7. The method of claim 5, each of the pre-handover and post-handover base stations comprising an airborne or space-borne base station.

8. The method of claim 1, each of the pre-handover and post-handover base stations comprising a mobile base station.

9. The method of claim 1, further comprising:
receiving at the at least one terminal a network message broadcast by the pre-handover base station to a set of plural terminals in the communications network, the network message containing handover information for the set of plural terminals in the communications network; and
entering a handover mode at the at least one terminal in response to the handover information in the network message.

10. A wireless communications network comprising:
a first base station wirelessly associated with a plurality of communications terminals authorized for communications in the network via the first base station;
at least one terminal of the plurality of terminals being operative to transmit synchronization information in a link layer of a network communications protocol during a handover event in the network;
a second base station operative to transmit a network response to the synchronization information for receipt by the at least one terminal; and
the at least one terminal operative to adjust timing for subsequent transmissions based on the network response, whereby synchronization with the second base station is facilitated during the handover event, wherein the at least one terminal further comprises:
a timing estimator operative to estimate an expected time for receiving a response to a transmitted signal from the first base station;
a comparator operative to compare the expected time relative to an actual time that a signal containing the network response to the transmitted signal is received at the at least one terminal from the second base station; and
a timing control operative to adjust frame timing for subsequent signal transmissions based on the comparison to facilitate synchronization with the second base station during the handover event.

11. The network of claim 10, the at least one terminal being operative to compute a difference between the expected time and the actual time the signal containing the network response was received, the timing control of the at least one terminal adjusting the timing for the subsequent signal transmissions based on computed difference.

12. The network of claim 10, the signal containing the network response further comprising synchronization information, the at least one terminal employing the synchronization information to adjust the frame timing for the subsequent signal transmissions so as to facilitate synchronization with the second base station.

13. The network of claim 12, the synchronization information further comprising at least one of position and velocity information for the second base station in the network.

14. The network of claim 12, the synchronization information further comprising an indication for the at least one terminal to advance or retard timing in performing the timing adjustment.

15. The network of claim 10, the at least one terminal being operative to enter a handover mode in response to detecting a discrepancy in framing associated with a signal received from the second base station relative to expected framing associated with a corresponding signal from the first base station.

16. The network of claim 15, the framing further comprising at least one of frame identification information and frame timing.

17. The network of claim 10, each of the first and second base stations comprising a space-borne or airborne mobile base station.

18. The network of claim 10, the first base station being operative to broadcast a network message to a set of at least some of the plurality of terminals that includes the at least one terminal, the network message containing handover information for the set of terminals in the communications network, each of the terminals in the set of terminals entering a handover mode in response to the handover information in the network message so as to enable handover from the first base station to the second base station.

19. The network of claim 18, each of the terminals in the set of terminals being operative in the handover mode to adjust timing for subsequent transmissions in the network based on corresponding frame timing difference between an expected response time for a signal received from the first base station relative to an actual response time for a response signal received from the second base station.

20. A terminal for wireless communications in a wireless communication network, the network having at least first and second base stations and being operative to hand communications for the terminal from the first over to the second base station, the terminal comprising:
a timing estimator operative to estimate an expected time for receiving a response to a transmitted signal from the first base station;
a comparator operative to compare the expected time relative to an actual time that a response to the transmitted signal is received at the terminal from the second base station; and
a timing control operative to adjust frame timing for subsequent signal transmissions based on the comparison, whereby synchronization of the terminal with the second base station during the handover event is facilitated, wherein the terminal is operative to compute a difference between the expected time and the actual time the response was received from the second base station, the timing control of the at least one terminal adjusting the timing for the subsequent signal transmissions based on the computed difference, and the terminal is operative to receive a network response to the transmitted signal, the network response comprising synchronization information, the terminal employing the synchronization information from the second base station to adjust the frame timing for the subsequent signal transmissions so as to facilitate synchronization with the second base station.

21. The terminal of claim 20, the synchronization information in the network response further comprising at least one of position and velocity information for the second base station in the network.

22. The terminal of claim 20, the synchronization information in the network response further comprising an indication for the terminal to advance or retard timing in performing the timing adjustment.

23. The terminal of claim 20, further being operative to enter a handover mode in response to detecting a discrepancy in framing associated with an actual signal received from the second base station relative to predicted framing associated with a corresponding expected signal from the first base station.

24. A communications system configured to facilitate handing over communications for a set of plural terminals in a wireless communications network from a pre-handover base station to a post-handover base station, each of plural terminals comprising:

means for transmitting a wireless signal in the communications network having timing information;

means for estimating an expected time for receiving a response to the transmitted wireless signal from the pre-handover base station;

means for receiving a response to the transmitted signal at an actual time from the post-handover base station;

means for comparing the expected time relative to the actual time the response was received;

means for adjusting frame timing for subsequent signal transmissions based on the comparison to facilitate synchronization with the post-handover base station; and means for computing a difference between the expected time and the actual time the response is received, the timing for the subsequent signal transmissions being adjusted based on the difference, wherein the response to the transmitted signal received from the post-handover base station further comprising synchronization information for adjusting the timing for the subsequent signal transmissions so as to facilitate synchronization with the post-handover base station.

* * * * *